Jan. 3, 1967   R. A. HORTON   3,296,006
PATTERN MATERIAL COMPOSITION
Filed Jan. 28, 1963
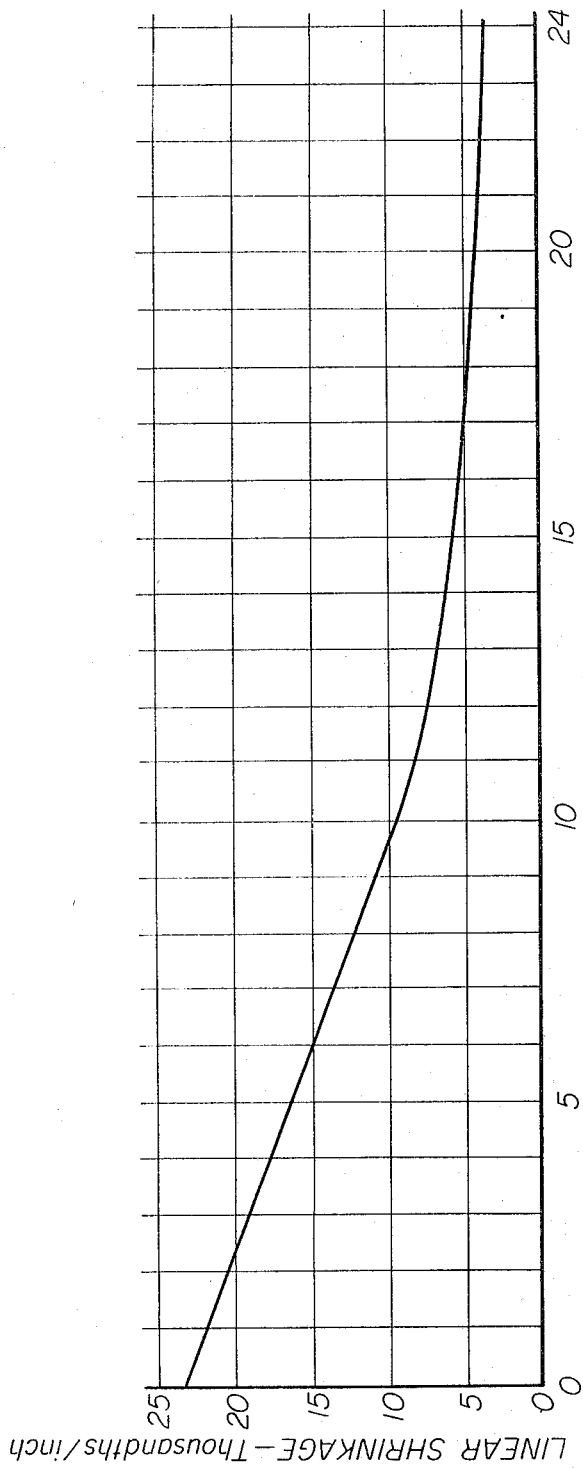
INVENTOR.
ROBERT A. HORTON
BY Watts & Fisher
Attorneys United States Patent Office 3,296,006
Patented Jan. 3, 1967

3,296,006
PATTERN MATERIAL COMPOSITION
Robert A. Horton, Chesterland, Ohio, assignor to
Precision Metalsmiths, Inc.
Filed Jan. 28, 1963, Ser. No. 254,329
21 Claims. (Cl. 106—38.7)

This invention relates generally to the art of investment casting, and more particularly to novel and improved pattern materials adapted for use in the so-called "lost pattern" process of precision investment casting.

In the "lost pattern" process of conventional investment casting, a disposable pattern, which is a replica of the part to be cast and which includes the necessary gates and risers, is usually dipped in a refractory slurry which hardens to form a smooth coating that serves as the mold face. After this pre-coat or dip-coat has dried, the coated pattern is placed in a suitable heat-resistant flask and the flask is filled with a cementitious refractory material, known as the "investment," which hardens at room temperature to form the bulk of the mold. The completed investment mold is subsequently heated to remove the pattern material so that metal or other molten material can be poured into the mold and allowed to solidify.

The pre-coating of the pattern usually is carried out by dipping it into a suspension of a fine refractory powder in a suitable liquid binder that is capable of hardening by drying at room conditions. Following dipping, the excess slurry is drained from the pattern and the coating is stuccoed while wet which coarser refractory particles which help to set the coating and to facilitate bonding between the coating and the back-up investment material. Under certain conditions, particularly in non-ferrous casting operations, the pre-coat can be omitted, however, a better surface inside the mold usually is obtained if the coating is used.

More recently, there has been a growing trend in the industry to use ceramic shell molds in place of the conventional, bulky investment molds described above. This development of ceramic shell mold techniques has been prompted by the decided advantages which shell molds offer in many applications. For example, as compared with conventional investment molds, ceramic shell molds are lighter and easier to handle, exhibit increased permeability and thermal shock resistance, provide for easier knock-out and clean-up after casting, do not require flasks, and provide greater flexibility in processing.

Ceramic shell molds are usually prepared by repeating the dipping and stuccoing operations described above until a refractory shell having a sufficient thickness to resist the stresses occurring in subsequent operations is built up around the pattern. The usual thickness range is from ⅛ inch to ½ inch, although thinner or heavier shells may be formed for special situations. After forming the refractory shell mold, the disposable pattern is then removed from the mold and it is prepared for the casting operation.

The pattern materials conventionally used in both the bulk investment and the ceramic shell molding processes have been either wax blends or synthetic resins, such as polystyrene and, occasionally, polyethylene. For reasons to be discussed hereinafter, wax patterns have been most widely employed even though the art has recognized that plastic patterns offer distinct advantages in many applications. For example, when only a small number of castings are required, as in prototype work which may involve a single casting for experimental purposes, it is usually faster and more economical to produce the patterns by machining operations instead of using special tooling, such as dies, as is required when forming pattern waxes. Polystyrene and many other plastics are machinable and thus well suited for such applications, whereas the pattern waxes generally lack the required toughness and dimensional stability. Another advantage is that prototype patterns made of plastic can be readily cemented together using conventional solvents, such as trichloroethylene, so that complicated pattern assemblies can be formed easily by combining relatively simple shapes.

From the standpoint of production work, plastic patterns can be made by injection molding equipment at much higher rates than can be obtained with wax pattern-forming operations. In addition, plastic patterns can be handled easily without breaking and do not crack at low temperatures or soften at high temperatures normally encountered.

Pattern waxes have continued to be used in spite of the many advantages of plastics because of the difficulties which have been encountered in processing plastic patterns, and particularly in removing plastic patterns from the molds. When a mold containing a disposable pattern is heated to melt or burn out the pattern material, severe internal pressures are created by the thermal expansion of the material. In most instances, the conventional bulk investment molds are strong enough to withstand the pressure created by the wax patterns so that the pattern can be removed without experiencing serious cracking. Nevertheless, some cracking of investment molds frequently will occur, this being particularly true when plastic patterns are used, and thus casting flash is still a fairly common defect.

Ceramic shell molds, on the other hand, do not have sufficient strength to resist the internal pressure created by relatively slow heating of the pattern material. In the case of wax patterns, the frequency of mold cracking has been reduced by a procedure known as "flash de-waxing." According to this procedure, the shell mold is placed directly into a furnace around 1800° F. The thermal diffusivity of the wax is sufficiently low relative to that of the shell that a surface layer of wax melts before the bulk of the wax can heat up enough to crack the shell. The molten wax is either absorbed by the shell or flows out of the mold, and this creates a space to accommodate the subsequent expansion of the bulk of the wax so that it will not crack the shell.

Attempts to apply the flash de-waxing concept to the removal of plastic patterns from ceramic shell molds have not been successful, however. Apparently, the conventional synthetic resins soften very gradually without significant melting at the mold interface. As a result, plastic patterns will expand and crack the shells before becoming fluid enough either to be absorbed into the mold or to squeeze out of the mold openings. Furthermore, the conventionally used plastics, especially polystyrene, tend to decompose rapidly under flash de-waxing conditions, and it is believed that the vapors which are evolved become trapped in the remaining viscous plastic to produce a foamy mass which further increases the cracking pressure within the mold.

The only known pattern removal technique heretofore developed which permits the combined use of plastic patterns and ceramic shell molds involve the steps of at least partially dissolving the patterns by the application of a liquid solvent and thereafter heating the mold to volatize any remaining pattern material. Usually the solvent is applied at room temperature by soaking the molds in a solvent bath. While the solvent-soaking technique has been commercially practiced on a large scale with satisfactory results, it does necessitate extra operations which are not required in the more conventional shell molding practices using wax patterns and flash de-waxing procedures.

Although in its broader aspects the invention is concerned with the provision of a disposable pattern material which can be used to advantage on a production basis in both conventional investment casting and ceramic shell molding techniques, the invention is particularly concerned with the provision of a disposable pattern material which can be used in the formation of prototype patterns. In general, the pattern material of the invention possesses the same advantageous properties which heretofore have made synthetic resins, and particularly polystyrene, the preferred material for prototype work. Thus, the pattern material is readily machinable and has the required toughness and dimensional stability. Relatively simple prototype patterns formed of the material described herein can be readily cemented together using conventional solvents to form complicated assemblies.

The pattern material of this invention also possesses several additional advantages over the plastics conventionally used for prototype pattern work. For example, a smoother machine finish can be obtained than with polystyrene. Also, the new material is more resistant to chipping and cracking under pressure. Thus, more stock can be removed with each cut and less stock is required to hold a piece in position during the machining operation. Another advantage is that cooling is not required during machining, as is the case with polystyrene.

In addition to being useful in prototype work, the pattern material of this invention offers the above-described production advantages of plastics in that it can be conveniently handled and injection molded using conventional plastic injection molding machines. However, as distinguished from plastics, the material can be eliminated successfully from ceramic shell molds, as well as from bulk investment molds, by flash de-waxing procedures. Thus, the invention makes it possible to obtain the combined advantages of plastics and shell molding techniques and, at the same time, provides for a single method of pattern removal which can be used in both bulk investment and shell molding operations.

As will hereinafter be discussed in detail, the linear shrinkage of the material during molding can be accurately controlled and adjusted over a wide range. This characteristic permits the material to be substituted for conventionally used pattern materials without requiring expensive changes in tooling.

Accordingly, an object of the present invention is to provide a new and improved pattern material which can be injection molded on conventional plastic injection machines and which responds successfully to flash de-waxing over a wide range of pattern sizes, including most of the parts heretofore processed from plastic patterns.

Another object of the invention is to provide a pattern material which has superior machining characteristics as compared to polystyrene, which can be easily joined to itself using common solvents, and which can be flash de-waxed from ceramic shell molds without cracking the shells.

Still another object of the invention is to provide a family of pattern materials whose linear shrinkage characteristics can be adjusted over a wide range.

Other objects and advantages of the invention will become apparent from the following detailed description and from the accompanying drawing which is a graph showing linear shrinkage characteristics of modified formulations.

The foregoing objects and advantages are obtained by a novel composition of matter which essentially comprises ethyl cellulose and one or more fatty acid ketones, such as laurone and stearone. As contemplated by the invention, the compositions may be modified by the addition of suitable plasticizers and other materials, including compatible waxes and fillers. In general, useful products can be obtained over the entire range of the following formulation.

| Material: | Percent by weight |
|---|---|
| Ethyl cellulose | 20–70 |
| Laurone and/or stearone | 20–80 |
| Plasticizer | 0–25 |
| Compatible waxes, resins, or solid fillers | 0–30 |

Compositions of the foregoing general formulation which fall within the scope of the invention may be distinguished by the following properties and characteristics:

(1) A softening point as determined by the A.S.T.M. ring and ball method (A.S.T.M. E28–51T) in the range of from about 210° F. to about 265° F.
(2) Injection moldable on conventional plastic injection molding machines in the range of from about 220° F. to about 320° F. at a pressure of approximately 1,000 p.s.i.
(3) Immediate surface melting to a low viscosity liquid when subjected to high oven temperatures in the range of from about 1600° F. to about 2300° F.

Ethyl cellulose is an ethyl ether of cellulose in which some or all of the replaceable OH groups on the anhydroglucose units of the cellulose chain have been replaced by ethoxyl groups. Commercial products generally have an average of about 2.15 to about 2.60 of the three replaceable OH groups on each anhydroglucose unit substituted, and such products are well suited for the purposes described herein. One particular commercial product which has been found satisfactory is sold under the trade name Standard Ethoxy Grade by the Dow Chemical Company.

Laurone and stearone are symmetrical aliphatic ketones derived from lauric acid and stearic acid, respectively. Commercially available ketones which are derived from commercial grades of lauric and stearic acids and which ketones may contain in small amounts the ketones of palmitic, oleic, caprylic and other such fatty acids, are suitable.

Plasticizers for the ethyl cellulose are preferably added to the pattern material compositions, although satisfactory results have been obtained in many applications without their use. Useful plasticizers include suitable vegetable oils, esters, and hydroabietyl alcohol. As will be discussed in more detail, castor oil is particularly useful, since it permits the shrinkage characteristics of the material to be controlled over a wide range.

In accordance with conventional practices, various waxes and resins which are compatible with the mixes, as well as combustible solid fillers, may be added for particular purposes, as, for example, to decrease the cost of the finished product. However, in applications requiring optimum strength and toughness in the finished product, such additions should be avoided.

Specific examples of preferred compositions for several purposes are as follows:

*Example I*

As noted above, the pattern material of the invention is particularly useful in applications such as prototype work in which disposable patterns are to be machined. The following preferred composition has been found to be suited ideally for this purpose.

| Material: | Percent by weight |
|---|---|
| Laurone | 45 |
| Stearone | 16 |
| Hydroabietyl alcohol | 4 |
| Ethyl cellulose, 10 cps. (Standard Ethoxy Grade) | 35 |

In the preferred method of preparation, the laurone, stearone and hydroabietyl alcohol are first melted together and then the ethyl cellulose is added while stirring and heating. After all of the ethyl cellulose is dissolved, the molten, semi-viscous material is poured into suitable forms, such as trays or molds, and subjected to a vacuum until all of the entrapped air has been removed. The material is then allowed to cool.

In some applications, large slabs may be made and pieces of the required size cut off as needed. Alternatively, specific shapes, such as cylinders, can be produced. In the latter instance, it is preferred that the molds be designed to permit directional solidification so that internal voids due to shrinkage are avoided.

*Example II*

The following composition has been found especially satisfactory for patterns which are produced by conventional plastic injection molding machines.

| Material: | Percent by weight |
|---|---|
| Laurone | 18 |
| Stearone | 20 |
| Castor oil | 2 |
| Ethyl cellulose, 10 cps. (Standard Ethoxy Grade) | 48 |
| Ethyl cellulose, 50 cps. (Standard Ethoxy Grade) | 12 |

As in Example I, the laurone, stearone and castor oil are first melted and then the ethyl cellulose added. In preparing the mix, the composition usually becomes extremely viscous as the ethyl cellulose goes into solution so that suitable mixing equipment is required. The material is finally heated to the temperature of from about 290° F. to about 300° F. and poured into trays to form thin slabs or strips which are allowed to cool.

In use, the slabs or strips are broken into smaller pieces and fed into the hopper of a plastic chopper. Suitable machines for this purpose are commercially available and serve to further reduce the chunks of plastic to granules of irregular shape measuring from about 1/8 inch to about 3/8 inch in length, width and thickness. The granules may be then fed from the chopper into the injection cylinder of a conventional plastic injection machine.

The pattern material formed as described above may be injection molded at temperatures of from about 220° F. to about 320° F. at a pressure of about 1,000 p.s.i. The cycle time for a pattern of any given size has been found to be approximately the same as that for similar size patterns produced from polystyrene.

The resulting patterns are characterized by excellent surfaces and by substantially immediate surface melting to a low viscosity liquid when subjected to high oven tempertures in the range of from about 1600° F. to about 2300° F. Because of the latter characteristic, the patterns can be removed from ceramic shell molds by placing the molds directly into a gas-fired furnace operating around 2000° F. and allowing the molds to remain in the furnace for about 10 minutes or until the last vestiges of pattern material have been removed. This method of pattern removal can be followed successfully with a wide range of pattern sizes.

Another advantageous characteristic of the material is that various shapes can be readily joined together using conventional solvents, particularly 1,1,1-trichlorethane and also trichloroethylene, to produce larger, more complicated assemblies. Further, the parts are of sufficient strength to permit handling and storing in bulk without breakage or distortion.

*Example III*

This example relates to the use of castor oil for the purpose of obtaining controlled shrinkage of the material over a wide range.

The basic composition which was used is as follows.

| Material: | Percent by weight |
|---|---|
| Laurone | 20 |
| Stearone | 20 |
| Ethyl cellulose, 10 cps. (Standard Ethoxy Grade) | 48 |
| Ethyl cellulose, 50 cps. (Standard Ethoxy Grade) | 12 |

A series of tests were conducted in which various amounts of castor oil were substituted for all or part of the laurone in the basic compositions and the shrinkage of each formulation determined. The material was compounded as in the previous example and was poured into a heavy metal mold having a shallow cavity 4½ inches by 1¼ inches by 3/8 inch in thickness. The length of each piece produced in the mold was measured after is had solidified and cooled to room temperature, and this was compared with the corresponding mold dimensions. From these tests a curve of shrinkage versus percent of castor oil was plotted, as shown in the accompanying drawing.

Referring to the drawing, it will be seen that the linear shrinkage decreases by an amount which is almost exactly proportional to the amount of castor oil added between 0 and 12%. Between 12% and about 20% castor oil, the shrinkage continues to decrease at a lower rate.

By compounding a desired composition to include the amount of castor oil required to obtain a desired amount of shrinkage, it is possible to prepare a material for specific applications that can be substituted for conventionally used pattern materials. In this manner, the pattern material of the invention can be used without requiring changes in tooling already available.

It will be apparent from the foregoing that the invention provides a novel pattern material composition which makes it possible to produce patterns quickly and economically with plastic injection machines in the same manner that polystyrene patterns heretofore have been made. Thus, the invention makes it possible to obtain all of the production and handling advantages of plastic patterns. At the same time, the material lends itself to flash de-waxing operations for pattern removal which heretofore have been made usable only in conjunction with pattern waxes. Hence, patterns made of the novel composition can be utilized in the ceramic shell molding process of investment casting without the relatively expensive and often time-consuming solvent soaking operations heretofore required for removal of plastic patterns from the shells.

The material provided by the invention also is of particular advantage in that it can be readily machined, as when producing single prototype patterns for experimental work. As explained above, the characteristics of the material make it possible to carry out the machining operations in a more advantageous manner than with conventional plastics, such as polystyrene.

Many modifications and variations of the invention will be apparent to those skilled in the art in view of the foregoing detailed disclosure. Therefore, it is to be understood that, within the scope of the appended claims, the invention can be practiced otherwise than as specifically described.

What is claimed is:

1. A heat disposable pattern composition comprising from about 20% to about 70% ethyl cellulose and from about 30% to about 80% of a fatty acid ketone, said composition being characterized by a softening point in the range from about 210° F. to about 265° F. and by substantially immediate surface melting to a low viscosity liquid when subjected to a temperature in the range from about 1600° F. to about 2300° F.

2. A heat disposable pattern material composition comprising from about 20% to about 70% ethyl cellulose and from about 30% to about 80% of a fatty acid ketone selected from the group consisting of laurone and stearone.

3. A pattern material composition comprising from about 20% to about 70% ethyl cellulose, from about 20% to about 80% of a fatty acid ketone, and from about 1% to about 25% of a plasticizer, said composition being characterized by substantially immediate surface melting to a low viscosity liquid when subjected to a temperature in the range of from about 1600° F. to about 2300° F. and by a softening point in the range of from about 210° F. to about 265° F.

4. A pattern material composition comprising from about 20% to about 70% ethyl cellulose, from about 20% to about 80% of a fatty acid ketone selected from the group consisting of laurone and stearone, and from about 1% to about 25% of a plasticizer.

5. A pattern material composition comprising from about 20% to about 70% ethyl cellulose, from about 20% to about 80% of a fatty acid ketone, and from about 1% to about 30% of a filler, said composition being characterized by substantially immediate surface melting when subjected to a temperature from about 1600° F. to about 2700° F. and by a softening point in a range from about 210° F. to 265° F.

6. A pattern material composition comprising from about 20% to about 70% ethyl cellulose, from about 20% to about 80% of a fatty acid ketone selected from the group consisting of laurone and stearone, and from about 1% to about 30% of a filler.

7. A pattern material composition comprising from about 20% to about 40% ethyl cellulose, from about 50% to about 70% of a fatty acid ketone, and from about 1% to about 10% of a plasticizer, said composition being characterized by substantially immediate surface melting when subjected to a temperature from about 1600° F. to about 2700° F. and by a softening point in a range from about 210° F. to about 265° F.

8. A pattern material composition comprising about 45% laurone, about 16% stearone, about 35% ethyl cellulose, and about 4% hydroabeityl alcohol.

9. A pattern material composition comprising from about 55% to about 65% ethyl cellulose, from about 30% to about 45% of a fatty acid ketone, and from about 1% to about 5% of a plasticizer, said composition being characterized by substantially immediate surface melting when subjected to a temperature from about 1600° F. to about 2700° F. and by a softening point in a range from about 210° F. to about 265° F.

10. A pattern material composition comprising about 18% laurone, about 20% stearone, about 65% ethyl cellulose, and about 2% castor oil.

11. A pattern material composition comprising from about 50% to about 70% ethyl cellulose, from about 20% to about 50% of a fatty acid ketone and from about 1% to about 25% castor oil, said composition being characterized by substantially immediate surface melting when subjected to a temperature from about 1600° F. to about 2700° F. and by a softening point in a range from about 210° F. to about 265° F.

12. The combination as claimed in claim 11 wherein the fatty acid ketone is selected from the group consisting of laurone and stearone.

13. A pattern material composition comprising from about 50% to about 70% ethyl cellulose, from about 1% to about 30% laurone, from about 20% to about 30% stearone, and from about 1% to about 25% castor oil.

14. A heat disposable pattern for use in the lost pattern process comprising from about 20% to about 70% ethyl cellulose and from about 30% to about 80% of a fatty acid ketone, said pattern being characterized by a softening point in the range of from about 210° F. to about 265° F. and by substantially immediate surface melting to a low viscosity liquid when subjected to a temperature in the range from about 1600° F. to about 2300° F.

15. A heat disposable pattern for use in the lost pattern process comprising from about 20% to about 70% ethyl cellulose and from about 30% to about 80% of a fatty acid ketone selected from the group consisting of laurone and stearone.

16. A pattern for use in the lost pattern process comprising from about 20% to about 70% ethyl cellulose, from about 20% to about 80% of a fatty acid ketone, and from about 1% to about 25% of a plasticizer, said pattern being characterized by substantially immediate surface melting to a low viscosity liquid when subjected to a temperature in the range of from about 1600° F. to about 2300° F. and by a softening point in the range of from about 210° F. to about 265° F.

17. A pattern for use in the lost pattern process comprising from about 20% to about 70% ethyl cellulose, from about 20% to about 80% of a fatty acid ketone, and from about 1% to about 30% of a filler, said pattern being characterized by substantially immediate surface melting when subjected to a temperature from about 1600° F. to about 2700° F. and by a softening point in a range from about 210° F. to 265° F.

18. A pattern for use in the lost pattern process comprising about 45% laurone, about 16% stearone, about 35% ethyl cellulose, and about 4% hydroabeityl alcohol.

19. A pattern for use in the lost pattern process comprising about 18% laurone, about 20% stearone, about 60% ethyl cellulose, and about 2% castor oil.

20. A pattern for use in the lost pattern process comprising from about 50% to about 70% ethyl cellulose, from about 20% to about 50% of a fatty acid ketone and from about 1% to about 25% castor oil, said pattern being characterized by substantially immediate surface melting when subjected to a temperature from about 1600° F. to about 2700° F. and by a softening point in a range from about 210° F. to about 265° F.

21. A pattern for use in the lost pattern process comprising from about 50% to about 70% ethyl cellulose, from about 1% to about 30% laurone, from about 20% to about 30% stearone, and from about 1% to about 25% castor oil.

References Cited by the Examiner

UNITED STATES PATENTS

| | | | |
|---|---|---|---|
| 2,098,537 | 11/1937 | Charch et al. | 106—186 XR |
| 2,235,516 | 3/1941 | Cornwell | 106—171 XR |
| 2,414,093 | 1/1947 | Cole et al. | 22—196 X |
| 2,535,290 | 12/1950 | Ivett et al. | 106—189 XR |
| 2,579,755 | 12/1951 | Pyle et al. | 106—189 XR |
| 2,751,316 | 6/1956 | Philips | 106—189 XR |

FOREIGN PATENTS

| | | |
|---|---|---|
| 462,983 | 2/1950 | Canada. |

ALEXANDER H. BRODMERKEL, *Primary Examiner.*

J. H. WOO, *Assistant Examiner.*